United States Patent
McGrath

(10) Patent No.: US 7,043,616 B1
(45) Date of Patent: May 9, 2006

(54) METHOD OF CONTROLLING ACCESS TO MODEL SPECIFIC REGISTERS OF A MICROPROCESSOR

(75) Inventor: Kevin J. McGrath, Los Gatos, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 329 days.

(21) Appl. No.: 10/419,084

(22) Filed: Apr. 18, 2003

(51) Int. Cl.
*G06F 12/00* (2006.01)

(52) U.S. Cl. ..................................... 711/163
(58) Field of Classification Search ............... 711/163; 713/200
See application file for complete search history.

(56) References Cited

U.S. PATENT DOCUMENTS

| | | | |
|---|---|---|---|
| 5,987,604 | A | 11/1999 | Edrich |
| 6,327,652 | B1 | 12/2001 | England et al. |
| 6,330,670 | B1 | 12/2001 | England et al. |
| 6,854,046 | B1 | 2/2005 | Evans et al. |
| 2002/0002673 | A1 | 1/2002 | Narin |
| 2003/0037089 | A1* | 2/2003 | Cota-Robles et al. .......... 709/1 |
| 2003/0101322 | A1* | 5/2003 | Gardner ....................... 711/163 |
| 2003/0200402 | A1 | 10/2003 | Willman et al. |

FOREIGN PATENT DOCUMENTS

EP  1 209 563 A2  11/2001

OTHER PUBLICATIONS

U.S. Appl. No. 10/419,084.
U.S. Appl. No. 10/429,132.
U.S. Appl. No. 10/654,734.
U.S. Appl. No. 10/419,085.
U.S. Appl. No. 10/419,086.
U.S. Appl. No. 10/419,038.
U.S. Appl. No. 10/419,083.
U.S. Appl. No. 10/419,090.
U.S. Appl. No. 10/419,121.
U.S. Appl. No. 10/419,122.
U.S. Appl. No. 10/419,120.
"Microsoft Scheme for PC Security Faces Flak", Merritt, *EE Times*, Issue 1227, Jul. 15, 2002.

* cited by examiner

*Primary Examiner*—Mano Padmanabhan
*Assistant Examiner*—Duc T Doan
(74) *Attorney, Agent, or Firm*—Meyertons Hood Kivlin Kowert & Goetzel, P.C.; B. Noël Kivlin; Stephen J. Curran

(57) ABSTRACT

A method of controlling access to a model specific register of a microprocessor. A method of controlling access to a model specific register of a processor having a normal execution mode and a secure execution mode may include storing processor state and mode information in the model specific register. Further, the method may include protection logic allowing a software invoked write access to modify the information within the model specific register during the normal execution mode. The method may further include security logic selectively inhibiting the software invoked write access during the secure execution mode.

28 Claims, 10 Drawing Sheets

METHOD OF CONTROLLING ACCESS TO MODEL SPECIFIC REGISTERS OF A MICROPROCESSOR

BACKGROUND OF THE INVENTION

1. Field of the Invention

This invention relates to computer systems and, more particularly, to protecting data stored within the computer system memory from unauthorized access.

2. Description of the Related Art

Modern computer systems are revolutionizing the way people live. This is particularly true for system platforms including microprocessors employing the x86 system architecture. The openness of the x86 architecture to a myriad of owner-installable third-party peripheral devices and applications has enabled a broad marketplace of hardware and software vendors that has fostered competition, innovation, and evolution. An example of such evolution is the now widespread use of the platform as a digital communication and media system of ever-increasing quality and capability. In concert with the Internet, these system platforms are clearly revolutionizing mass distribution of digital content, allowing on-demand access to newspapers, real-time weather conditions and radio stations from around the world, on-line banking and shopping, and audio and video-based entertainment.

Since the x86 platform is an open architecture, devices typically have vendor-supplied drivers which run in Kernel mode in order to access the devices, and certain software applications may include Kernel mode components. Thus, although the open architecture may have advantages and may still provide a large degree of protection against accidental interference of one application with another, the current architectural protection mechanisms may be exposed in this environment to unwanted manipulation.

Computer systems including microprocessors employing the x86 architecture include features designed to protect against applications interfering with each other. For example, x86-based operating systems rely on two features of the x86 Protected mode architecture to provide an environment where applications are isolated from each other, and critical operating system code and data is isolated from applications: 1) paged virtual memory, and 2) execution privilege level.

Paged virtual memory allows the Operating System (OS) to define a separate virtual address space for each application, and to selectively map individual pages of physical memory into each of those virtual address spaces through a set of address translation tables. This provides each application with its own private section of physical memory for code and data that may be inaccessible to other applications. The virtual memory mechanism may also allow the OS to selectively map pages of physical memory into multiple virtual address spaces, and to selectively designate such pages in virtual space as read-only. This shared mapping capability may also allow a copy of the OS Kernel itself to reside in each application's address space, and may likewise allow shared mappings of peripheral device access ports and associated device driver routines, thus providing applications with efficient access to OS services without requiring costly address space switches. But the OS portion of the address space necessarily includes system data areas that OS code must be able to modify, and which must still be protected from application code. The read-only designation may not provide proper protection for such areas.

The x86 architecture also defines four privilege levels, 0 through 3, which are assigned to regions of code by the OS and kept in code segment descriptors. Typically, the privilege level of currently executing code or procedure will be stored as the Current Privilege Level (CPL). Thus the privilege levels are commonly referred to as CPL0 through CPL3. Using these privilege levels, certain system resources are accessible only to code executing at the proper level. The paged virtual memory architecture may allow access to pages of virtual memory to be restricted by privilege level. Although four privilege levels are defined, only the CPL0 and CPL3 levels are typically supported. CPL0 is commonly referred to as Kernel mode and is the most privileged level, while CPL3 is commonly referred to as User mode and is the least privileged level. OS code and data are typically assigned to CPL0 while application code and data are assigned to CPL3. CPL0 execution privilege does not override read-only protection; the two attributes are independent. Code segment descriptors are used to assign these levels.

In addition to this memory protection, all processor control registers, including those that control virtual memory operation, are by architectural definition accessible only at CPL0. In addition, special control transfer instructions are typically required to switch execution from one segment to another, and hence to switch privilege levels. These instructions allow the OS to limit the targets of such control transfers to specific entry points in OS-controlled code, hence an application may not change privilege level without simultaneously handing control over to the OS.

The isolation of address spaces from each other, and of OS memory from applications, may be completely controlled by the contents of the virtual memory address translation tables. The translation tables define the virtual-to-physical page mappings that isolate one application's memory from another's, and also the read-only and privilege level attributes that protect shared libraries and the OS. The tables themselves are memory-resident data structures, and contain translation entries that map them into the shared OS memory area and restrict access to them to Kernel mode code.

The existing protection mechanisms would seem to provide adequate protection for applications and the operating system. In a well-behaved system, (e.g. correct application of these mechanisms by the operating system, and correct operation of the OS code that controls these mechanisms, and that all other code which runs in Kernel mode does not interfere with this) they do. However, typical x86-based systems include such a large amount of Kernel-mode code, not just from the OS vendors but from many independent sources, that it may be impossible for anyone to assure that such interference, whether accidental or otherwise cannot occur.

Depending on the type of operation that a user is performing and the type of software application that is running, information stored within or running on the computer system may be vulnerable to outside access. Thus, it may be desirable to improve security and thereby possibly make x86 architecture systems less vulnerable to such access.

SUMMARY OF THE INVENTION

Various embodiments of a method of controlling access to model specific registers of a microprocessor are disclosed. In one embodiment, a method of controlling access to a model specific register of a processor having a normal execution mode and a secure execution mode may include storing processor information in the model specific register. Further, the method may include protection logic allowing a software invoked write access to modify the information within the model specific register during the normal execution mode. The method may further include security logic selectively inhibiting the software invoked write access during the secure execution mode.

In one implementation, the method may further include allowing the software invoked write access to modify the information within the model specific register in response to the processor operating in a secure kernel mode.

In another embodiment, a processor having a normal execution mode and a secure execution mode may include execution logic, a model specific register and protection logic which may allow a software invoked write access to modify the information within the model specific register during the normal execution mode. Further, the protection logic may include security logic which may selectively inhibit the software invoked write access during the secure execution mode.

Figure 1:
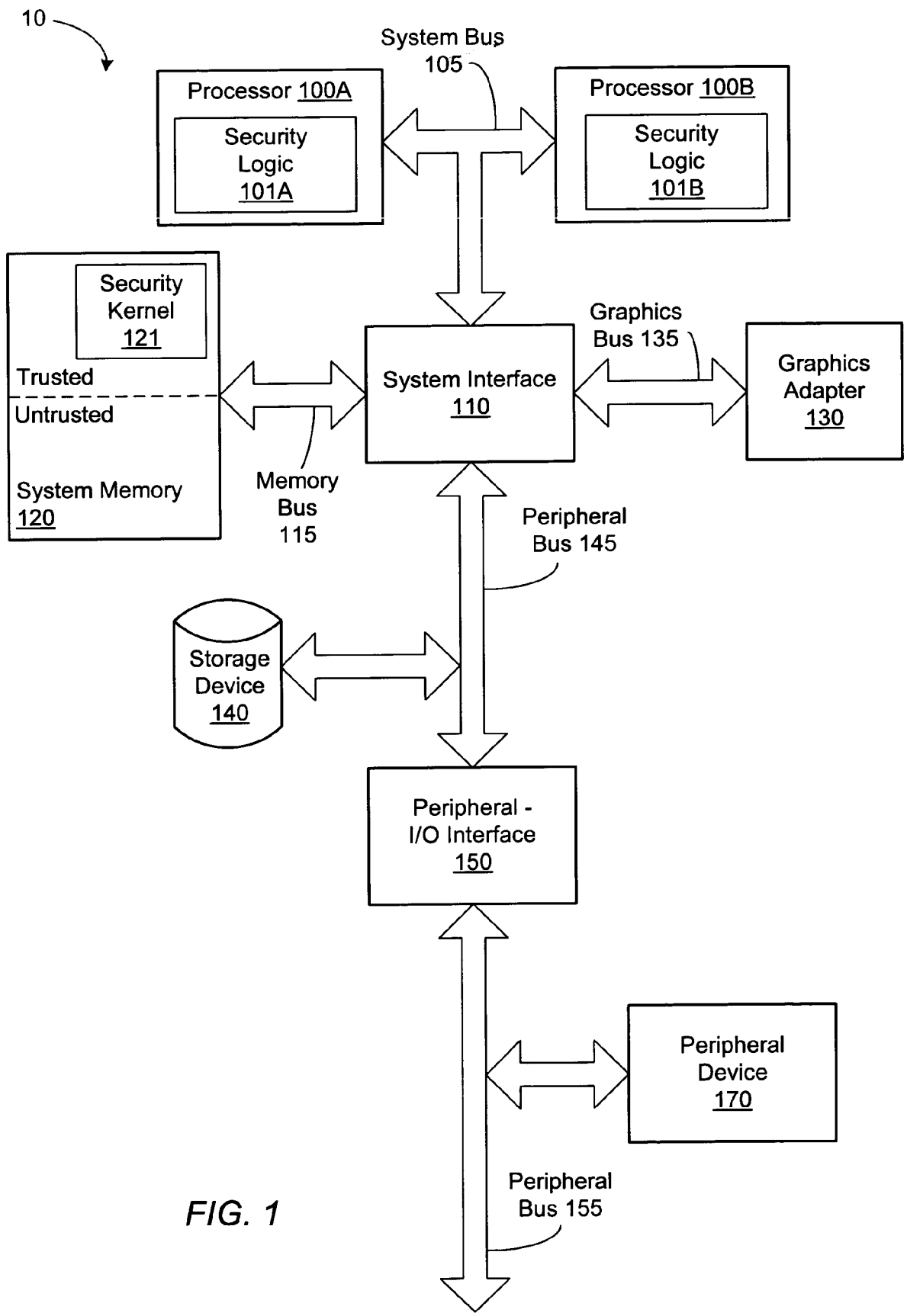
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram of one embodiment of a computer system 10 is shown. Computer system 10 includes a microprocessor 100A and a microprocessor 1001B each coupled to a system interface 110 via a system bus 105. Microprocessor 100A and 100B include a security logic 10A and 101B, respectively. System interface 110 is coupled to a graphics adapter 130 via a graphics bus 135, a system memory 120 via a memory bus 115, to a peripheral interface 150 and to a storage device 140 via a peripheral bus 145. Peripheral interface 150 is coupled to a peripheral device 170 via a peripheral bus 155. It is noted that although two processors 100A and 100B are shown coupled to system interface 105, it is contemplated that other embodiments may include other numbers of processors. It is further noted that components having the same reference number may be referred to using only the reference number. It is also noted that microprocessors are commonly referred to as processors. For example, microprocessors 100A and 1001B may be referred to as processor 100.

In the illustrated embodiment, processor 100 is an example of a microprocessor employing the x86 architecture. For example, in one embodiment, processor 100 may be an Athlon™ processor by Advanced Micro Devices, Inc. or a processor in the Pentium™ Processor family by Intel Corporation. As such, processor 100 is configured to execute x86 instructions which may be stored in system memory 120 or storage device 140. As described above, processor 100 includes architectural features such as Protected mode, which provides for paged virtual memory and privileged execution modes, and the set of control registers which controls these features. As will be described in greater detail below, controlling access to control registers and page tables may provide additional protection from unauthorized access to program code and data within computer system 10. Thus, a set of architectural extensions to processors such as processor 100 and corresponding software support may provide this protection. The overall security enhancements may be referred to as a secure execution mode (SEM). Accordingly, in the illustrated embodiment, processor 100 includes hardware such as security logic 101 that, when enabled by SEM, provides support for SEM operating modes such as a trusted execution (TX) mode of operation, for example. As will be described further below, the trusted execution mode may include, depending on what software is executing and its privilege level, processor 100 operating in a secure user mode and a secure kernel mode in addition to the normal user mode and normal kernel mode.

In one embodiment, system bus 105 may be a shared bus arrangement such as a front side bus (FSB), for example. In such an embodiment, processor 100A and 100B may be coupled in parallel to system interface 110. In a typical shared bus arrangement, address, data and control signals may be shared by processor 100A and 100B. However, in other embodiments, it is contemplated that processor 100A and 100B may be coupled to system interface 110 by individual point-to-point bus link connections such as a link which is compatible with the HyperTransport™ Technology specification.

System interface 110 is a bus interface configured to control transactions between processor 100 and system memory 120 and between I/O and peripheral devices such as peripheral device 170 and system memory 120. System interface 110 is sometimes referred to as a system controller or a host bridge and may include a memory controller (not shown), a peripheral bus interface (not shown), a graphics bus interface (not shown) and a system bus interface (not shown).

Graphics adapter 130 may be configured to generate and render graphic images for display on a system display (not shown). Graphics bus 135 may be a high-speed graphics bus such as an accelerated graphics port (AGP) bus.

System memory 120 is configured to store program instructions and data that is frequently used by processor 100. In a typical system configuration, storage device 140 may be used to more permanently store the program instructions and data and as processor 100 needs the data and program code, it may be transferred to system memory 120. As will be described in greater detail below, additional support for SEM operating modes may be provided by a piece of program code referred to as a security kernel 121 which may be executed in conjunction with the OS out of system memory 120 during operation of processor 100. In addition, system memory 120 may be partitioned into a trusted portion and an untrusted portion. In the illustrated embodiment, security kernel 121 resides in the trusted portion of system memory 120. As described above, system memory 120 is typically accessed using paged virtual memory. In such an arrangement, system memory 120 may be accessed by individual pages or chunks of memory. This paging function is typically handled by OS memory management functions.

In one embodiment, system memory 120 may be implemented using a plurality of memory chips implemented in dynamic random access memory (DRAM) technology or in one of the varieties of DRAM technologies available, such as synchronous DRAM (SDRAM), for example. The DRAM chips are typically mounted on small circuit boards having an edge connector which are inserted into a socket connector on a motherboard. Depending on the configuration of the boards, they may be referred to as either single or dual in-line memory modules (e.g. SIMMs or DIMMs, respectively). System memory 120 may include multiple banks of memory modules which may allow memory expansion.

As described above, storage device 140 may store program code and data. In one embodiment, storage device 140 may be a hard disk drive or a bank of hard disk drives, although other embodiments are contemplated that include other mass storage devices such as CD-ROM drives, floppy disk drives and tape drives, for example.

Peripheral interface 150 is configured to provide bus control and translation for transactions between different peripheral buses. For example, peripheral bus 145 may be a peripheral component interconnect (PCI) bus and peripheral bus 155 may be an Industry Standard Architecture (ISA) or Extended ISA (EISA) bus.

Peripheral device 170 may be any peripheral device such as a modem, video capture device or other general purpose input output device, for example. It is noted that in other embodiments, other numbers of peripheral devices may be used.

Figure 2:
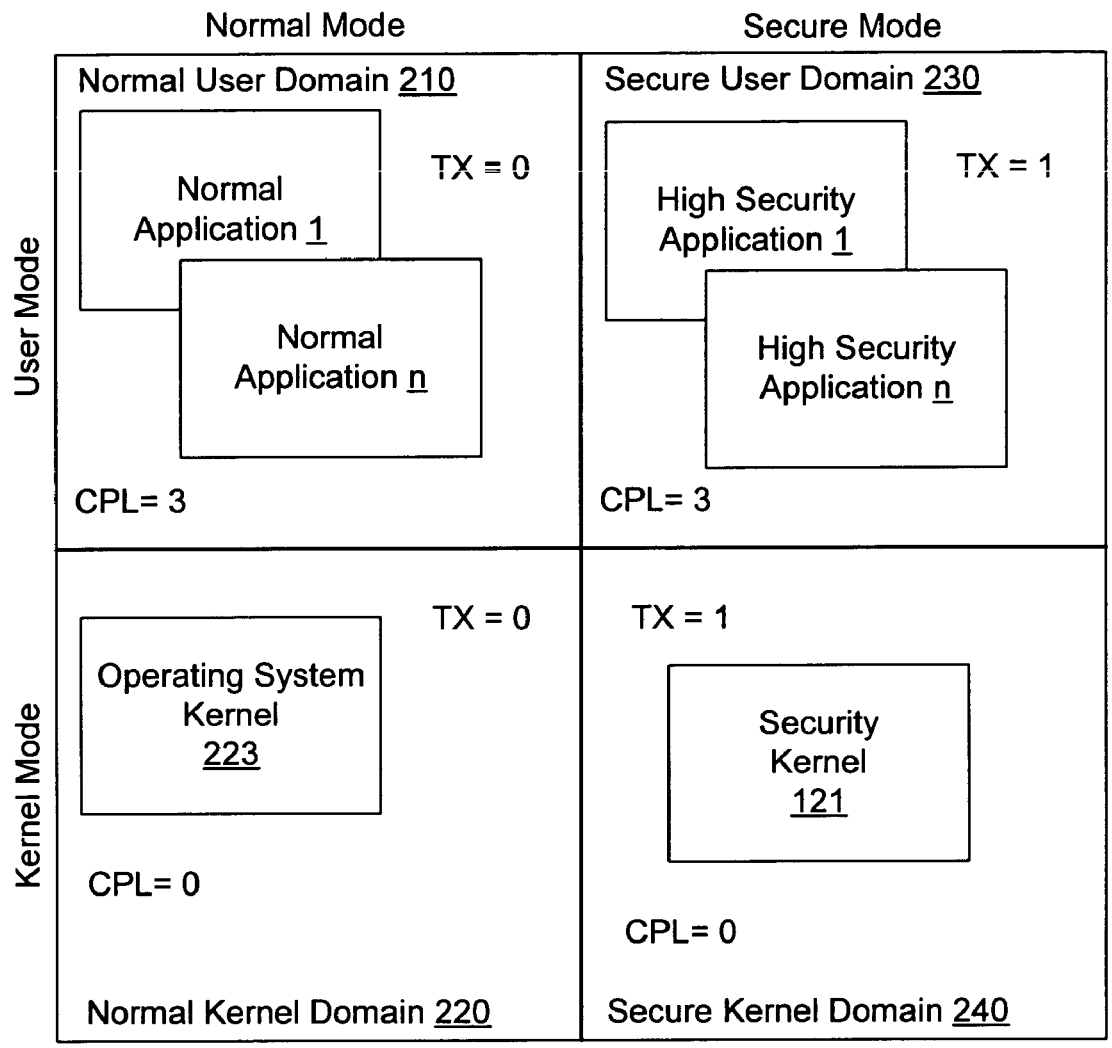
FIG. 2 is a diagram illustrating the operational domains of one embodiment of a processor and the behavior of code operating in those domains.

Referring to FIG. 2, a diagram illustrating the operational domains of one embodiment of a processor and the behavior of code operating in those domains is shown. As described above, current x86-based operating systems typically use two of the four available privilege levels (e.g., CPL0 and CPL3) to implement two modes within a normal execution mode or protection domain: Normal Kernel Mode and Normal User Mode. The SEM enhancements, when SEM is enabled, define a new execution mode which is referred to as trusted execution (TX) mode. When combined with the existing normal execution mode protection domains, TX mode creates the four distinct modes or software operational domains described below. In the illustrated embodiment, the four domains are normal user (NU) domain 210, normal kernel (NK) domain 220, secure user (SU) domain 230 and secure kernel (SK) domain 240.

The NU 210 domain may be characterized by processor 100 running in normal user mode (i.e. CPL=3) and not in trusted execution (TX) mode. In the NU 210 domain, typical virtual memory settings allow for normal operation of unmodified applications. Under SEM, such applications are however prevented from accessing the memory of applications residing in the SU domain 230, or the memory containing Security Kernel 121 in the SK domain 240. Further, such applications are prevented from accessing the memory of the OS Kernel 223 or device drivers in the Normal Kernel domain 220 by existing protection logic mechanisms such as U/S and R/W page attributes for example (not shown in FIG. 2).

In the NK domain 220, SEM allows for normal operation of unmodified OS Kernel 223 components and kernel-mode device drivers. Code executing in this domain may access objects in the NU domain 210, but is prevented under SEM from accessing objects in either the SU domain 230 or the SK domain 240. Further, the NK domain 220 may be characterized by processor 100 running in Normal Kernel mode (i.e. CPL=0) but not in TX mode. When paging is enabled in the NK domain 220, processor 100 may sometimes be referred to as operating in a Native kernel mode.

In the SU domain 240, SEM may allow a new type of application software such as high security application (HSA) 1, for example to run. HSA software may be prevented from accessing objects in any other domain by existing x86 page protection and page mapping mechanisms. In addition, the HSAs are protected from unauthorized access by any code executing in the NU domain 210 and the NK domain 220, including the operating system kernel 223 and device drivers (not shown in FIG. 2). As will be described in greater detail below, security kernel 121 may be responsible for setting up and maintaining the virtual address spaces of HSAs. Further, the SU domain 240 may be characterized by processor 100 running in User mode (i.e. CPL=3) but also in TX mode, which may also be referred to as a secure user mode.

In the SK domain 240, SEM may allow security kernel 121 full access to all platform resources and in addition may give exclusive control of those resources to security kernel 121. The SK domain 240 may be characterized by processor 100 running in Kernel mode (i.e. CPL=0) and also in TX mode, which may also be referred to as a secure kernel mode.

Figure 3:
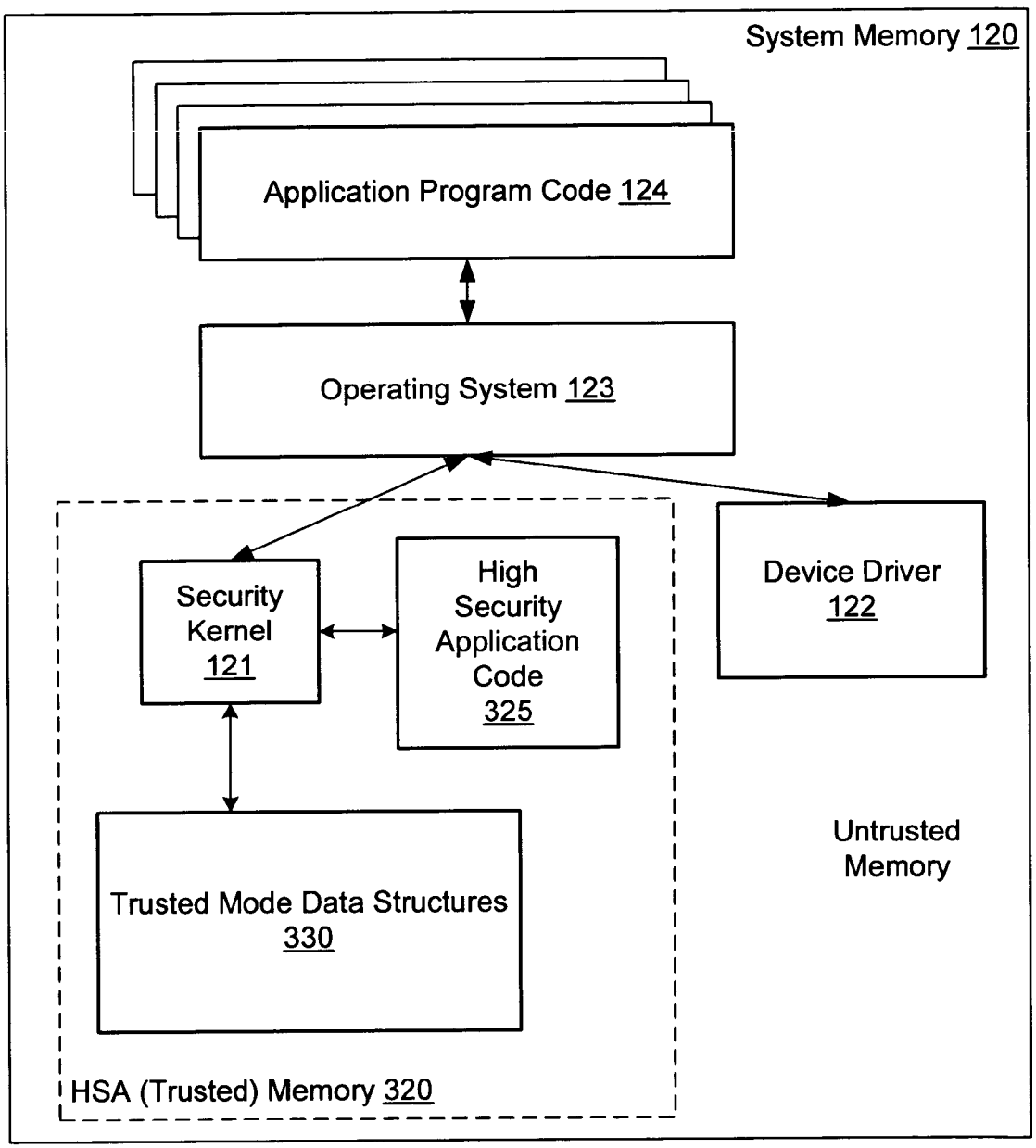
FIG. 3 is diagram illustrating one embodiment of software residing in untrusted and trusted system memory.

Turning to FIG. 3, a diagram illustrating one embodiment of software residing in untrusted and trusted system memory is shown. Components that correspond to those shown in FIG. 1 and FIG. 2 are numbered identically for simplicity and clarity. As described above in conjunction with the description of FIG. 1, storage device 140 may store instructions and data. During execution by processor 100, portions of code may be moved from storage device 140 into system memory 120. Thus, in the illustrated embodiment, operating system (OS) code 123, application program code 124 and a device driver 122 may be executed out of system memory 120 by processor 100. In addition, security kernel 121, associated trusted mode data structures 330 and high security application (HSA) program code 325 may also be executed out of system memory 120 by processor 100. As described above, in the illustrated embodiment, security kernel 121, trusted mode data structures 330 and HSA program code 325 are shown residing in a portion of system memory 120 referred to as HSA (trusted) memory 320. As will be described in greater detail below, trusted memory 320 may be assigned and maintained by security kernel 121.

Operating system (OS) 123 is an example of a typical operating system such as one of the Windows™ family of operating systems by the Microsoft™ Corporation. OS 123 may provide a user interface and a software platform on top of which application program code 124 may run. In addition, OS 123 may provide basic support functions such as file management, process management, memory management and I/O control, for example. It is noted that multiple copies of the OS 123 may be stored within system memory 120.

Application program code 124 is an example of any of the many different software packages that a user may run on computer system 10. For example, a user may run spreadsheet software, word processing software or Internet browsing software. In the illustrated embodiment, application program code 124 resides in the untrusted portion of system memory 120 and may be executed in the NU domain 210.

Device driver 122 is an example of software which when executed, may operate hardware components such as peripheral device 170 of FIG. 1 or a modem or graphics device (not shown), for example. Device drivers frequently execute in the NK domain 220 to access certain processor Protected mode functions. In the illustrated embodiment, device driver 122 resides in the untrusted portion of system memory 120. It is noted that although only one device driver 122 is shown, it is contemplated that multiple device drivers may be executed depending on the number of devices in computer system 10 of FIG. 1.

Security kernel 121 is software which runs in the trusted execution (TX) mode. In one embodiment, security kernel 121 may be the only software that runs in the SK domain 240 of FIG. 2. In SK domain 240, security kernel 121 may control all virtual-to-physical memory mappings, and may control what areas of physical memory are accessible to external devices. However, security kernel 121 may rely on the OS kernel's process creation functions, including normal mode virtual memory mappings, initial mapping of HSA memory 320 and loading of HSA code 325 and data sections. Security kernel 121 may however monitor every such mappings to ensure that there is no unauthorized mapping of trusted memory into untrusted virtual spaces. Thus, security kernel 121 may regard all areas of memory that are not trusted as untrusted. Further, security kernel 121 may regard all running program code that is not controlled by security kernel 121 to be untrusted. Accordingly as described above, the system may be referred as having a trusted side and an untrusted side. It is noted that in one embodiment, the TX mode may be entered via a control transfer under security kernel 121 guidance with SEM enabled.

Security Kernel 121 may be configured to manage the security-related aspects of the system. For example, security kernel 121 may manage virtualization of the address translation mechanism, manage secure applications and act as a firewall between those secure applications and untrusted side of the system. In addition, security kernel 121 may create, protect and maintain trusted mode data structures 330. It is noted that in one embodiment, security kernel 121 may be a stand-alone code segment which may be a patch to an existing OS. In alternative embodiments, security kernel 121 may be a module or code segment within and part of a given OS.

HSA program code 325 is an example of an on-line banking application or a multimedia application, for example. In one embodiment, HSA program code 325 resides in trusted memory 320 and may execute in the SU domain 230.

In one embodiment, an SEM enabled system may distinguish three types of pages in physical memory from all other pages: trusted pages, root pages and page map pages. Trusted pages may include pages which form HSA memory 320 and which security kernel 121 prevents the untrusted side of the system from accessing. Root pages may contain root tables that define individual virtual address spaces such as page directory tables, for example. Page map pages may include pages which contain address translation tables from anywhere in the address translation table hierarchies.

Thus, to allow security kernel 121 to keep track of which physical pages in memory belong to which type of page, trusted mode data structures 330 may include memory resident data structures (not shown in FIG. 3) which correspond to the three types of pages in physical memory, as defined by SEM. In one embodiment, trusted mode data structures 330 may include a trusted page vector (TPV), a root page vector (RPV), a page map page vector (PMV). In the illustrated embodiment, trusted mode data structures 330 reside in trusted memory 320 space. In one embodiment, each of the above data structures may be implemented as a vector including one bit for each page in physical memory. In such an embodiment, the contents of each vector identify which pages of physical memory correspond to which type of page. For example, if a bit within the RPV is set, it means that a respective page in memory is a root table page. The vectors may be accessed by either software or hardware. It is further noted that in various other embodiments a page may be identified as a particular type of page by a clear bit in a given page vector.

In addition, it is noted that other embodiments may include other secure mode data structures (not shown in FIG. 3). For example, as will be described in greater detail below in conjunction with the description of FIG. 8, one such embodiment may include a secure mode data structure which may be indicative of whether a given processor register has been designated as protected or not.

Figure 4:
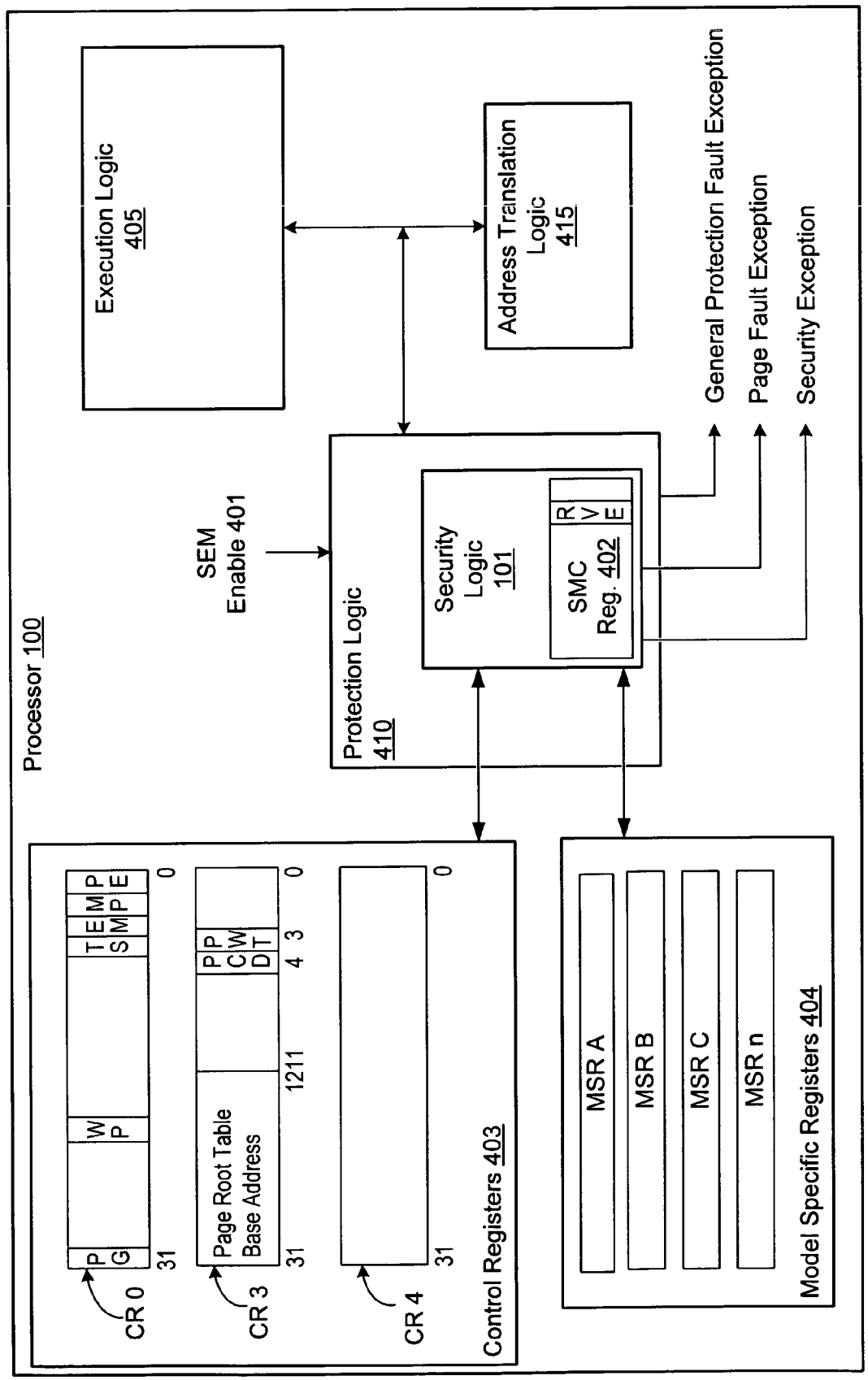
FIG. 4 is a block diagram of one embodiment of a processor.

Referring to FIG. 4, a block diagram of one embodiment of a processor is shown. Components that correspond to those shown in FIG. 1–FIG. 3 are numbered identically for simplicity and clarity. Processor 100 includes execution logic 405 which may be configured to execute code in a pipelined fashion. During operation, execution logic 405 may generate linear addresses. Linear addresses are commonly referred to as virtual addresses. As will be described in greater detail below, address translation logic 415 is coupled to receive the linear addresses and if processor 100 is operating with paging enabled, address translation logic 415 may translate the linear addresses into physical addresses. Further, processor 100 includes protection logic 410 which is coupled to the execution logic 405 and address translation logic 415 and may be configured to monitor accesses to the translation table hierarchy by performing page type checks. As will be described further below, protection logic 410 includes security logic 101 which may be configured to provide support for SEM enhancements.

Processor 100 also includes a plurality of control registers 403. In the illustrated embodiment, control registers CR0, CR3 and CR4 are shown coupled to security logic 101. It is noted that processor 100 may include other control registers which are not shown or described for clarity. In addition, processor 100 includes a plurality of model specific registers (MSRs) 404. MSRs 404 are shown as MSR A, B, C and n, where n is representative of any number.

Control registers 403 (e.g., CR0, CR3 and CR4) include various control flags and fields which control the operating mode of processor 100. It is noted that the number of bits in the control registers is generally implementation specific. For example, in the illustrated embodiment, processor 100 includes 32-bit control registers, although it is contemplated that in other embodiments processor 100 may include certain 64-bit control registers.

CR0 includes control flags which control processor 100 operating modes and states. For example, Bit 0 of CR0 is a PE flag configured to enable the protected mode of processor 100 when set. Bit 31 of CR0 is a PG flag used to enable paging mode when set. Thus, in one embodiment of processor 100, to enable paging, both bits 0 and 31 should be set.

CR3 contains the upper order bits of the base physical address of the currently active page or root directory in memory. CR3 also includes control bits which control page directory caching within processor 100 cache memory (not shown). Bit 3 of CR3 is denoted as the page level write-though (PWT) flag and selects whether the root table uses a write-through or write-back cache policy. Bit 4 of CR3 is denoted as the page level cache disable (PCD) flag and selects whether the root table may be cached or not.

CR4 includes control flags which may enable processor architectural extensions and which may be indicative of OS support of certain processor functions. It is noted that control registers CR0, CR3 and CR4 may include other flags (not shown) having predefined definitions which are not shown or described for simplicity.

Various processor implementations also provide MSRs for software control over the unique features supported by a specific processor implementation. Thus, since the MSRs are by definition implementation specific, for any given processor model, a given MSR may not have the same functionality as another processor model. However, some MSRs of one x86 architecture processor may be compatible with other x86 architecture processors. Generally speaking, MSRs may be provided for such features as machine checking, memory typing, system software, software debugging, and performance monitoring, for example. Accordingly, the MSRs may include control bits for controlling these various hardware and software-related features. Depending upon the mode in which processor 100 is operating in, the MSRs may be accessed by the read and write commands: RDMSR and WRMSR, respectively.

Security logic 101 may access a plurality of secure mode-related registers which may enable and disable security related functions. For example, in the illustrated embodiment, security logic 101 includes a secure mode control register (SMC) 402 which may include control flags which enable and disable aspects of processor execution such as certain hardware accelerations and certain processor features that may compromise security during secure mode execution. Security logic 101 may be enabled and disabled by a SEM enable signal 401, although other embodiments are contemplated in which security logic 101 may be enabled differently. In one embodiment, SEM enable signal 401 may be derived from an SEM enable flag (not shown) in a designated control register or a model specific register being asserted during a secure initialization process. As will be described in greater detail below, secure mode control register 402 includes a root vector enable (RVE) flag. It is noted that in one embodiment, secure mode control register 402 may be implemented as a model specific register (MSR). It is also noted that secure mode control register 402 may include other flags (not shown) as desired for controlling other security related aspects of processor 100.

Security logic 101 may inhibit unauthorized modification of control registers 403 by monitoring accesses and causing security exceptions to be generated in response to detecting certain accesses to control registers 403, thereby overriding the normal x86 protection logic 410 of processor 100. For example, in one embodiment, in response to detecting a write access to control registers 403, security logic 101 may cause a security exception to be generated dependent upon the mode in which processor 100 is operating.

In addition, security logic 101 may also include logic (not shown) configured to inhibit unauthorized modification of certain protected MSRs 404 by monitoring accesses and causing security exceptions to be generated in response to detecting accesses to the protected MSRs. For example in one embodiment, in response to detecting a WRMSR instruction, security logic 101 may cause a security exception to be generated. As will be described in greater detail below in conjunction with the description of FIG. 8 and FIG. 9, depending on such factors as the operating mode and domain of processor 100 for example, security logic 101 may be configured to cause a security exception which may be unconditionally handled by security kernel 121 and which may inhibit any unauthorized modification of MSRs.

Further, security logic 101 may also be configured to monitor accesses to address translation tables when page mode is enabled. As will be described in greater detail below in conjunction with the descriptions of FIG. 5 and FIG. 10, depending on such factors as the tape of access, processor operating mode and privilege level for example, security logic 101 may be configured to selectively cause a security exception to be generated instead of a page fault exception, since security exceptions may be handled by security kernel 121 instead of being handled by the OS IDT exception handler, and thus inhibiting any unauthorized modification of translation table contents.

Figure 5:
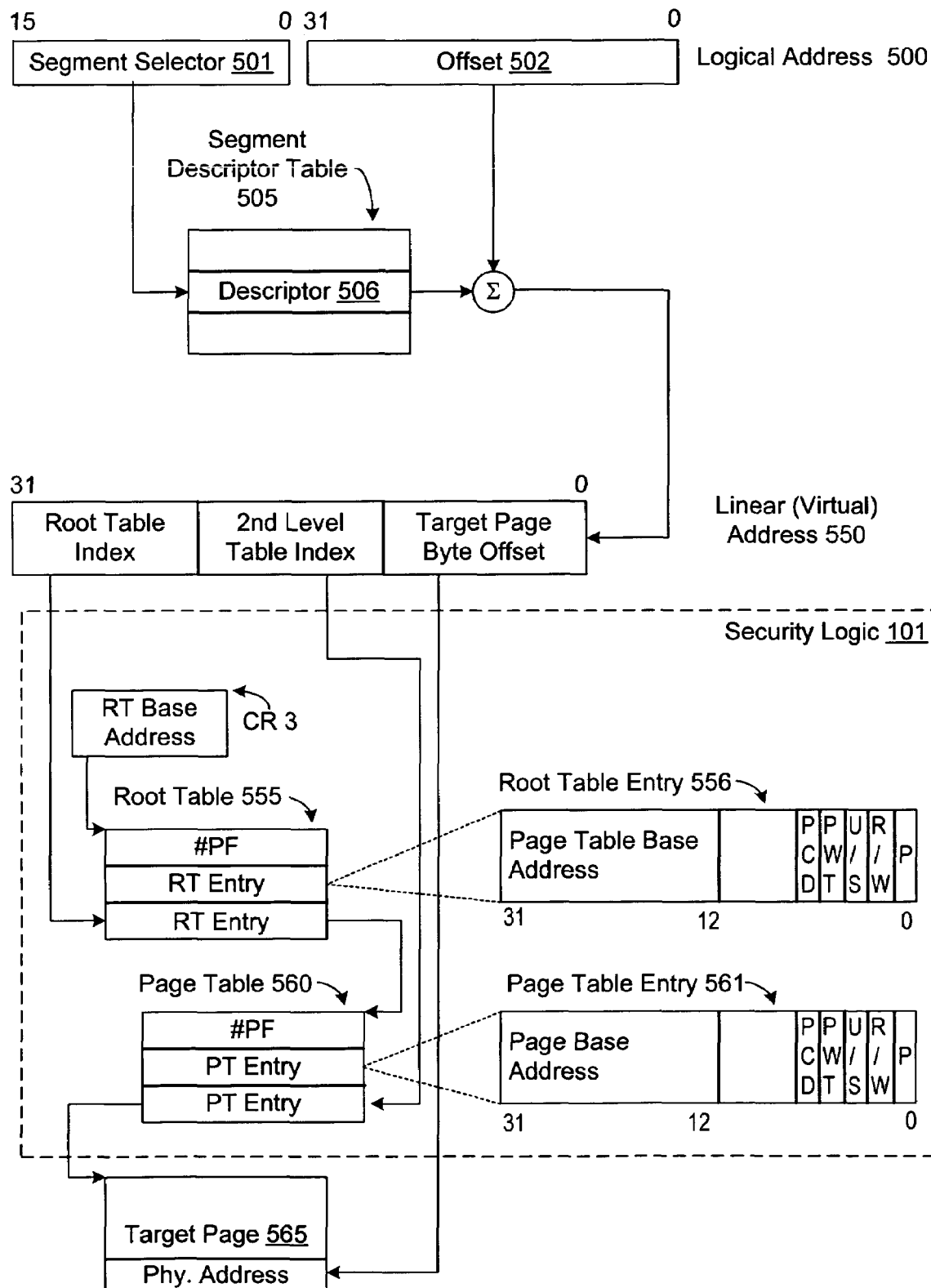
FIG. 5 is a diagram of one embodiment of a logical address to physical address translation apparatus.

Turning to FIG. 5, a diagram of one embodiment of a logical address to physical address translation apparatus is shown. Components that correspond to those shown in FIG. 1–FIG. 4 are numbered identically for simplicity and clarity. When using paged virtual memory (i.e., paging is enabled via bit 31 of CR0), processor 100 uses the control registers and a variety of data structures or tables stored in system memory 120 and/or trusted memory 320 to translate logical addresses into physical addresses through a series of address mappings. Processor 100 divides the linear address space into fixed-size pages that may be mapped into physical memory such as system memory 120 and/or storage device 140. When a program references a logical address in memory, the processor translates the address into a linear address and then uses its paging mechanism to translate the linear address into a corresponding physical address of a page of memory. Generally, if the requested page is not currently loaded in system memory 120, a page fault exception (#PF) may be generated. The OS IDT exception handler may then direct the OS to load the page from system storage 140 into system memory 120. Execution may then be returned from the exception handler and the instruction which caused the exception may be restarted.

It is noted that the illustrated embodiment depicts an example of 32-bit addressing and 4 Kbyte page translation. Thus, a logical address 500 includes a 32-bit offset 502 and a 16-bit segment selector 501. It is noted that extended addressing mechanisms are available although not shown. Logical address 500 may be translated by using the offset specified in segment selector 501 to locate a segment descriptor 506 in the segment descriptor table 505. Processor 100 examines segment descriptor 506 to check the access rights and range of the segment to insure that the segment is accessible and that the offset is within the limits of the segment. Processor 100 adds a base address of the segment found in segment descriptor 506 to offset 502 and thus forming a linear or "virtual" address 550.

In one embodiment, linear address 550 is represented by 32 bits. Bits 31–22 provide an offset of an entry in a data structure known as a root table 555. Root table 555 is also commonly referred to as a page directory. Each entry in root table 555 includes a base physical address of another data structure known as a page table 560. An exemplary root table entry format is shown in root table entry 556. Bits 21–12 of linear address 550 provide an offset of an entry within page table 560. Each entry in page table 560 includes a base physical address of a target page 565 in physical memory. An exemplary page table entry format is shown in page table entry 561. Bits 11–0 of linear address 550 provide an offset to a physical address within target page 565. It is noted that multiple sets of translation tables and pages may exist in system memory 120. As described above, the currently active root table base address is stored in CR3.

In addition to the page table base physical address, root table entry 556 also includes a plurality of control flags which may specify attributes of the page table at the base address specified in bits 31–12. Specifically, bit 0, denoted as the present (P) flag indicates whether the specified page table is currently loaded in system memory 120. Bit 1, denoted as the read/write (R/W) flag, selects whether the page table referenced by that entry is read-only. If the entry is a recursive entry, the R/W bit indicates whether all pages referenced by the recursive entry are read-only. Bit 2, denoted as the user/supervisor (U/S) flag, selects whether the page table and the group of pages within that page table have supervisory or user privileges. Similar to the PWT flag in CR3, bit 3, denoted as the page level write-though (PWT) flag, selects whether the page table uses a write through or write-back cache policy. Likewise, bit 4, denoted as the page level cache disable (PCD) flag, indicates whether the page table may be cached or not. It is noted that in other embodiments, root table entry 556 may include various other flag bits (not shown) having other functionality.

In addition to the base address of a physical page in memory, page table entry 560 includes a plurality of control flags which may specify attributes of the physical page at the base address specified in bits 31–12. Specifically, bit 0, denoted as the present (P) flag indicates whether the specified page is currently loaded in system memory 120. Bit 1, denoted as the read/write (R/W) flag, selects whether the page referenced by that entry is read-only. Bit 2, denoted as the user/supervisor (U/S) flag, selects whether the page has supervisory or user privileges. Similar to the PWT flag in CR3, bit 3 denoted as the page level write-though (PWT) flag, selects whether the page uses a write through or write-back cache policy. Likewise, bit 4, denoted as the page level cache disable (PCD) flag, indicates whether the page may be cached or not. It is noted that in other embodiments, root table entry 356 may include various other flag bits (not shown) having other functionality.

As described above, protection mechanisms of the x86 Protected mode architecture, as used by today's operating systems, are contained within the virtual address translation tables (e.g., root table 555 and page table 560) and the control registers CR0, CR3 and CR4 described above. Each set of these tables defines a virtual memory space and which areas of physical memory are mapped into that space, as well as any privilege level or read-only access restrictions. At any given time, the contents of control register CR3 determine which set of tables, and hence which virtual address space, is active. As long as the virtual paging mechanism is enabled, all code, regardless of privilege level, must go through these tables to access physical memory and can only access physical memory which is mapped into virtual space by these tables. This may be unconditionally enforced by existing well-known and well-proven hardware mechanisms. Thus, to access physical memory that is not mapped by these tables, executing code may either modify the tables to create the appropriate mappings, modify the contents of CR3 to activate a different set of tables with the desired mappings or disable the virtual memory mechanism by modifying the appropriate control register (e.g. CR0, PG flag).

Thus, to protect these tables and registers against unauthorized modification and to secure any part of physical memory against accesses by untrusted code, security logic 101, which may operate in conjunction with security kernel 121, may be configured to restrict such untrusted code to translation tables which do not map the trusted memory (e.g., by limiting what can be written to CR3), and to disallow any modification to those tables that would create such mappings.

Depending upon the mode in which processor 100 is operating and what modifications are proposed may determine which modifications of CR3, if any, may be authorized and thus allowed. It is noted that in one embodiment, if processor 100 is operating in the TX mode, all write accesses to CR3 and to the address translation tables may be allowed, since trusted mode code (e.g., security kernel 121 and some HSA code 325) may have full access to all data structures and pages in system memory 120 and to all system registers including the control registers. However, when processor 100 is operating in normal mode the above protections may be enabled.

When security kernel 121 and OS 123 initially create the address translation table mappings, the R/W attribute of all conventionally mapped address translation tables may be set to read-only by clearing the R/W flag in the page table entries that map them. In addition, all recursively mapped tables may be set to read-only by clearing the R/W flag in the recursive root entry. This root-level read-only attribute propagates down the hierarchy during a table walk and may override any lower level setting as provided in the x86 architecture R/W behavior. This effectively makes all the tables read-only when accessed via the recursive root entry. However, this may not effect the R/W attributes of the actual pages mapped by the leaf tables. Those tables are accessible via addresses that start their table walk at root entries other than the recursive one. Thus, they retain the R/W attributes set by OS 123 and security kernel 121 in the page tables that map them.

Some attempted writes to a table having a read-only attribute may be inhibited by the existing x86 normal protection logic 410 of processor 100 by generating a read-only page fault exception. However when SEM is enabled, the read-only page fault may be detected by security logic 101 and may thus cause security logic 101 to generate a security exception dependent upon the operating mode of processor 100. For example, in one embodiment, if processor 100 is operating in Native kernel mode (e.g., CPL=0, TX=0), a write to a read-only address translation table that is marked as present will cause a security exception to be generated. Otherwise, a page fault exception may be generated and the OS IDT exception handler may handle the page fault exception.

As will be described in greater detail below in conjunction with the description of FIG. 10, to determine the nature of a write, a write access to read-only page table hierarchy may be write filtered and a security exception may be generated.

Figure 6:
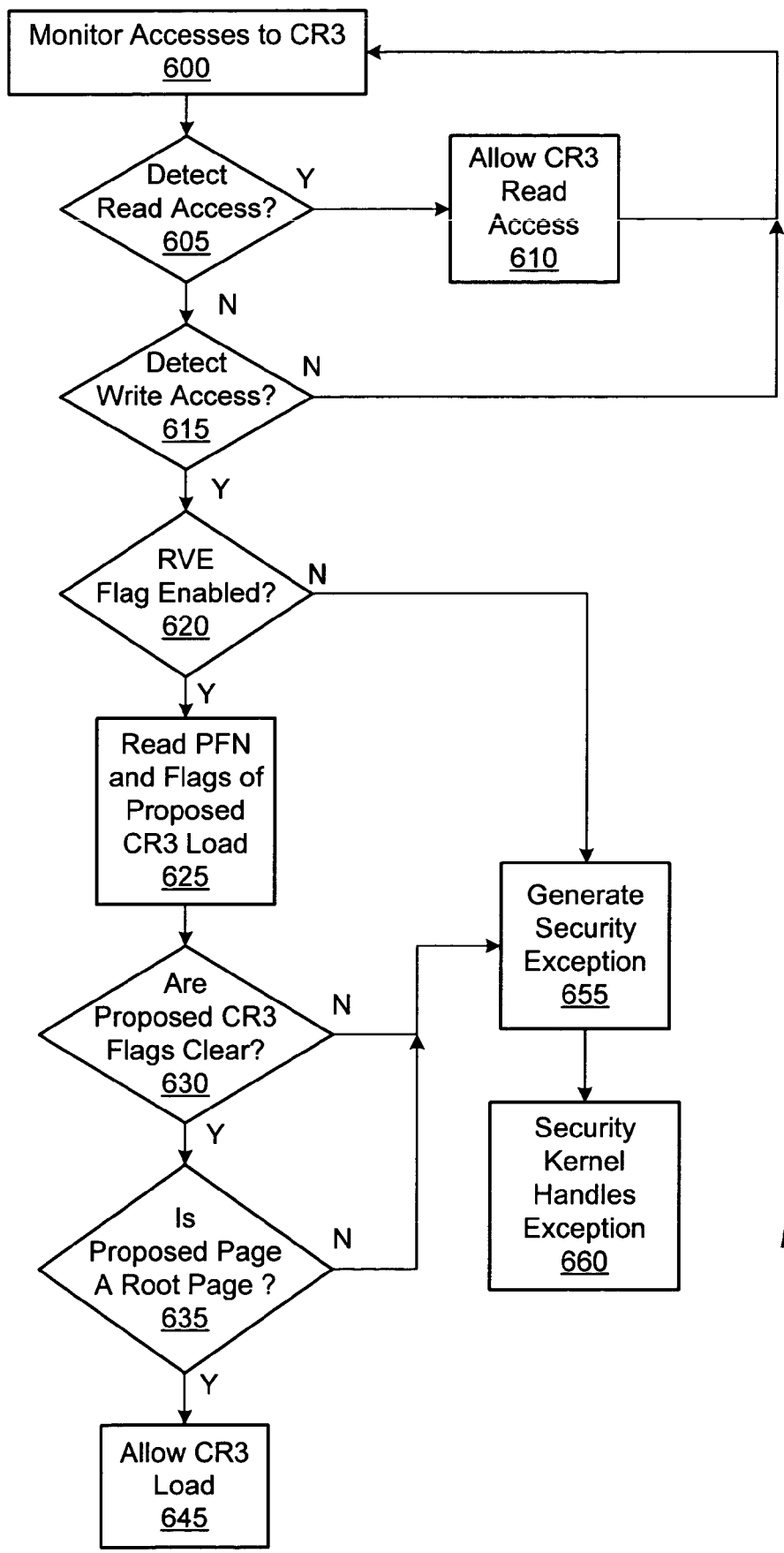
FIG. 6 is a flow diagram describing protection of control register CR3 by one embodiment of security logic and the security kernel.

FIG. 6 illustrates a flow diagram describing protection of control register CR3 by one embodiment of security logic and the security kernel. Referring collectively to FIG. 1 through FIG. 5, security logic 101 is assumed to be enabled by SEM enable signal 401 and processor 100 is assumed to be in normal kernel mode. Security logic 101 is configured to monitor all accesses to CR3 (block 600). If a read access is detected (block 605), the read access to CR3 may be allowed to proceed (block 610).

Referring back to block 605, if a read access is not detected (block 610), and a write access is not detected (block 615), security logic 101 continues monitoring accesses to CR3 (block 600).

Typically, the contents of CR3 may be modified using a MOV CR3 instruction or a control transfer via a task gate. The MOV instruction is a type of load instruction where data may be loaded into a destination operand, which in this case is control register CR3. A task gate is a gate used to control access between code segments between tasks. A task gate may also be used to transfer control to an interrupt-service routine (ISR) if the ISR is also a task. A detailed description of task gates may be found in the AMD™ x86-64 Architecture Programmer's Manual Volume 2.

Referring back to block 615, in response to detecting a write access to CR3, security logic 101 may selectively inhibit or prevent the write access. As described above, in one embodiment, secure mode control register 402 includes a root vector enable (RVE) flag bit. The RVE flag controls whether security logic 101 may reference or look at the root page vector to determine whether to generate an unconditional security exception upon detection of a write access to CR3, thereby effectively filtering write accesses to CR3.

Thus, if the RVE flag is not asserted (block 620), upon detection of a write access to CR3, security logic 101 may cause an unconditional security exception to be generated (block 655).

Generally speaking, a security exception is an exception which when generated, may be handled by the OS IDT handler using a predetermined interrupt vector or by an exception handler within security kernel 121. For example, in one embodiment, if processor 100 is operating in Native kernel mode or normal kernel mode when a security exception is generated, an security kernel 121 may directly handle the security exception. Alternatively, if processor 100 is operating in a user mode such as normal user mode, security logic 101 may cause a security exception to be generated and the OS IDT exception handler may handle the security exception like any other general protection fault. The IDT mechanism may then pass the exception to the OS kernel mode handler which may in turn pass the exception to security kernel 121. However, since control registers may typically only be accessed in modes such as Native kernel mode, security kernel 121 handles the CR3 load exception (block 660).

Referring back to block 620, if the RVE flag is enabled, CR3 write filtering is enabled. In response to detecting a write access to CR3, security logic 101 is configured to reference the root page vector prior to asserting access detect signal 405. For example, the root table base address field (sometimes referred to as the Page frame Number (PFN)) of a proposed MOV CR3 instruction may be read and used as an index into the RPV (block 625). The RPV is accessed (block 630) and the bit pointed to by the index is checked to ensure that the corresponding page in system memory 120 is a legitimate root table. Thus, if the bit is set, the page is a root page (block 635).

In addition to checking the root table base address during a proposed CR3 write access, the control flag settings of the proposed CR3 load may also be checked by security logic 101. For example, in one embodiment, the PCD and PWT flags should both be zero in a proposed load of CR3 (block 640). If the proposed CR3 flags are clear and the page pointed to by the RPV bit is a root page, the load of CR3 may be allowed to proceed (block 645).

Referring back to block 635, if the bit in the RPV is found to be clear, indicating the page is not a root page, the load of CR3 may not be allowed to proceed (i.e. the write is inhibited). Security logic 101 may cause a CR3 load security exception to be generated (block 655).

In block 660, in one embodiment, during a CR3 load security exception, security kernel 121 may set the RPV bit and return to the instruction that caused the exception, which may then execute to completion. In an alternative embodiment, security kernel 121 may allow the load to complete via emulation without setting the RPV bit and return to the instruction following the instruction that caused the exception. In various other embodiments, it is contemplated that security kernel 121 may abort the code sequence as necessary.

Figure 7:
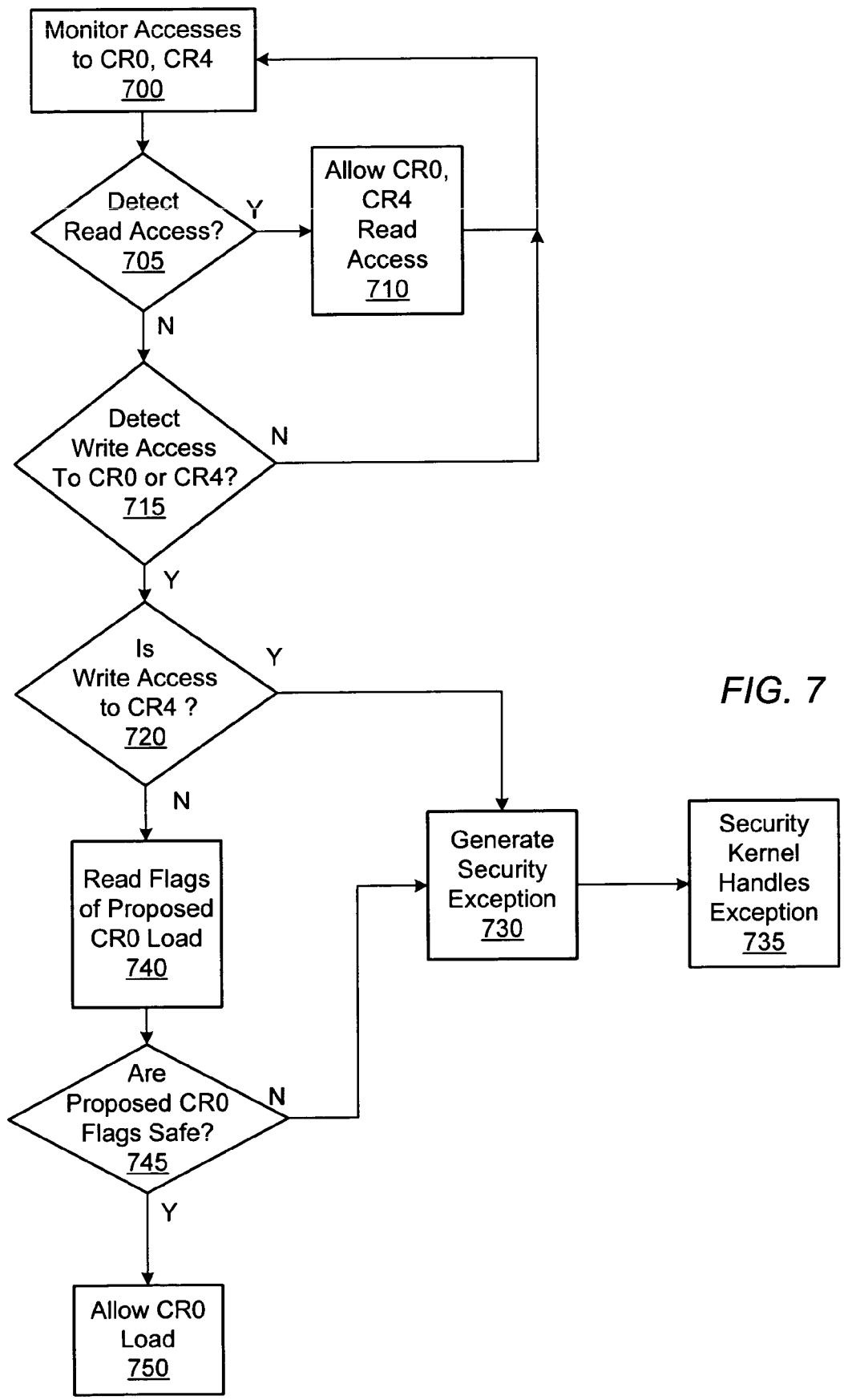
FIG. 7 is a flow diagram describing protection of control register CR0 and CR4 by one embodiment of security logic and the security kernel.

FIG. 7 illustrates a flow diagram describing protection of CR0 and CR4 by one embodiment of security logic and the security kernel. In addition to protecting CR3, security logic 101 may also protect certain other control registers (e.g., CR0 and CR4), from unauthorized modification. Referring collectively to FIG. 1–FIG. 5, security logic 101 is assumed to be enabled by SEM enable signal 401 and processor 100 is assumed to be in normal kernel mode. Security logic 101 is configured to monitor all accesses to control registers CR0 and CR4 (block 700). If a read access is detected (block 705), the read access may be allowed to proceed (block 710). If a read access is not detected (block 705) and a write access is not detected to CR0 or CR4 (block 715), security logic 101 continues monitoring accesses to CR0 and CR4 (block 700).

Referring back to block 715, if a write access is detected to CR0 or CR4, security logic 101 may differentiate write accesses to CR4 (block 720) since no writes to CR4 are allowed. If the write access is to CR4, security logic 101 may cause an unconditional security exception to be generated (block 730).

If the write access is not to CR4 (block 720), security logic 101 may evaluate which flags within CR0 the proposed write access will modify (block 740). Some write accesses may be allowed since certain flags within CR0 may pose no security issues and may thus be modified. For example, in one embodiment, the PG, PE, EM and TS flags within CR0 may be modified without causing a security exception. Thus, if the write access is deemed safe (block 745), the load of CR0 may be allowed to proceed (block 750).

Referring back to block 745, if the write access to CR0 would modify bits other than those bits considered safe, security logic 101 may cause a security exception to be generated (block 730), which may be handled by security kernel 121 (block 735).

As described above, access to certain MSRs may present a security risk when secure mode is enabled. Thus, Native kernel mode write accesses to protected MSRs may be inhibited. An MSR may be designated as protected by security kernel 121. Thus, security kernel 121 may maintain a listing of the MSRs which are protected. The listing of protected MSRs of processor 100 may be a trusted mode data structure 330 in the form of a bit map.

Figure 8:
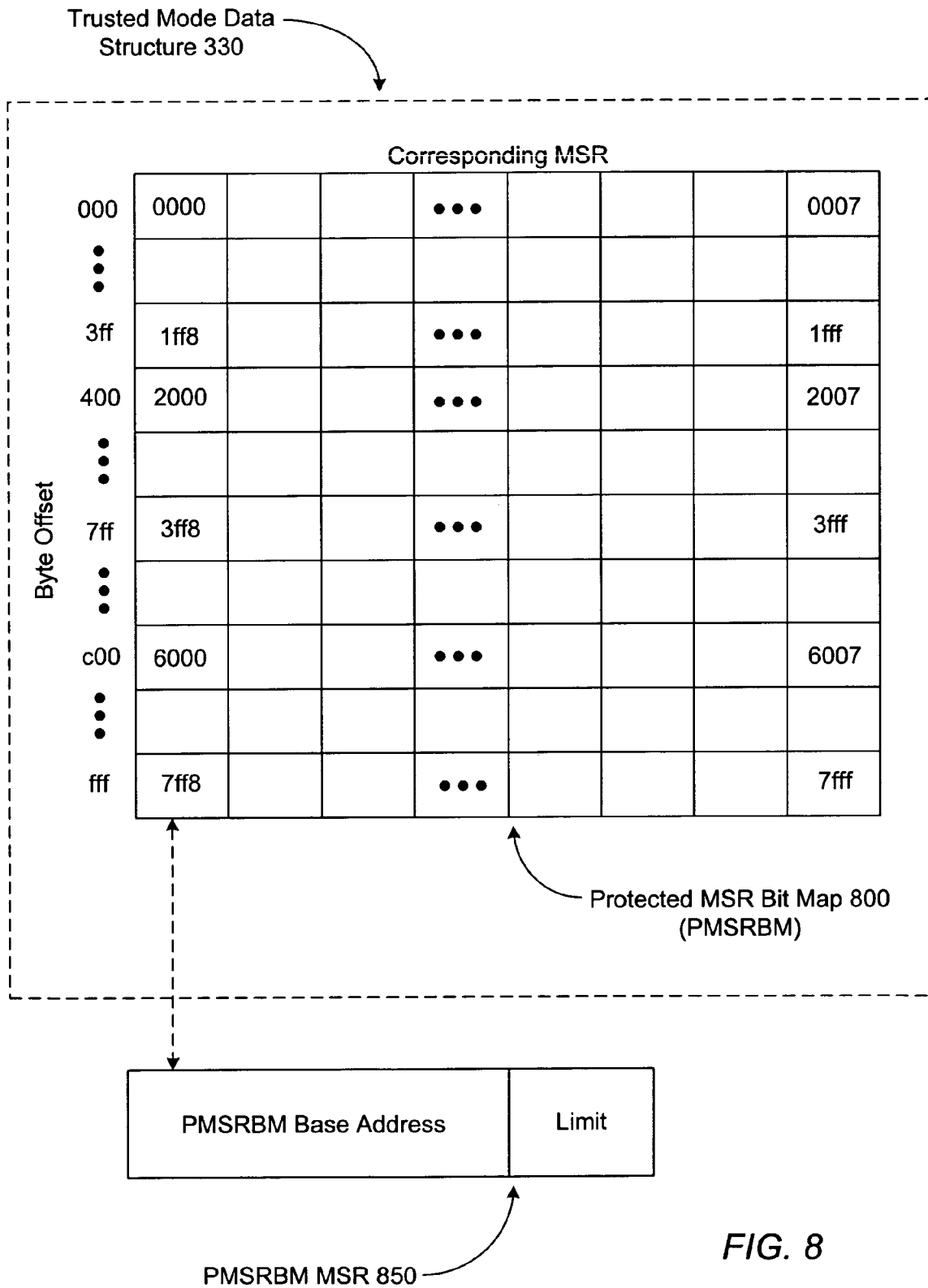
FIG. 8 is a diagram of one embodiment of a trusted mode data structure and an associated base address register.

Turning to FIG. 8, a drawing of one embodiment of a trusted mode data structure and an exemplary associated bit map base address register are shown. Components that correspond to those shown in FIG. 1–FIG. 5 are numbered identically for simplicity and clarity. In the illustrated embodiment, the listing of protected MSRs of processor 100 is a trusted mode data structure 330 designated as a Protected MSR bit map (PMSRBM) 800. PMSRBM 800 is accessed via a PMSRBM Base MSR 850. It is noted that the various MSRs are located in 8 Kbyte ranges which may be widely separated from each other. Thus, PMSRBM 800 may be a 4 Kbyte bit map ranging from 000–fff including several smaller 1 Kbyte bit maps.

Table 1 below, includes four rows and three columns and shows how, in one embodiment, the ranges of PMSRBM 800 may correspond to the ranges of the MSRs. Each row corresponds to a bit map having a range of byte offsets. Each range of byte offsets corresponds to a range of MSRs. For example, in row 1, the byte offset is 000–3ff. This 1 Kbyte range corresponds to MSRs in the range 0000_0000–0000_1fff. This particular set of MSRs may be compatible with other x86 processors. In row 2, the byte offset is 400–7ff. This 1 Kbyte range corresponds to MSRs in the range c000_0000–c000_1fff. This particular set of MSRs may be processor specific. The remaining rows are similarly arranged. It is noted that the byte offset range of 000–fff is an exemplary range only and that other embodiments are contemplated which use other ranges.

TABLE 1

Protected MSR Bit Map ranges

| Byte Offset | MSR Range | Current Use |
| --- | --- | --- |
| 000-3ff | 0000_0000–0000_1fff | Other x86 Compatible MSRs |
| 400-7ff | c000_0000–c000_1fff | Processor Specific MSRs |
| 800-bff | c001_0000–c001_1fff | Other Processor Specific MSRs |
| c00-fff | xxxx_xxxx–xxxx_xxxx | Future Processor MSRs |

Referring back to FIG. 8, the base address of PMSRBM 800 may be stored in PMSRBM Base MSR 850. PMSRBM Base MSR 850 may itself be a protected MSR and includes a limit field and a base address field. In one embodiment, the limit field may be used to identify the number of pages which security kernel 121 has defined for PMSRBM 800. In one embodiment, if the limit field is equal to zero, then all MSRs are protected and the bit map lookup is disabled. Accordingly, any write access to an MSR may cause a security exception to be generated. Further, any MSRs which map to ranges outside the range specified by the limit field may be treated as protected by security kernel 121. The base address field includes the base physical address of the bit map in system memory 120. The physical address is used since the data structure is a security kernel 121 generated structure and is not mapped by the OS kernel. Thus, no virtual mapping may exist for the page(s) PMSRBM 800. It is noted that in one embodiment, the entire PMSRBM 800 may be allocated to one physical page of memory with room for expansion, although in other embodiments other numbers of physical pages of memory may be allocated. However, in embodiments having additional pages, it may be convenient (although not necessary) to make each page contiguous to the previous page such that a single MSR may point to the bit map.

The PMSRBM 800 may be implemented as a secure mode data structure which may reside in trusted memory 320 of system memory 120. Security kernel 121 may be responsible for creating and maintaining PMSRBM 800. In one embodiment, PMSRBM 800 may be referenced by a WRMSR instruction which is executed when processor 100 is in the Native kernel mode. The WRMSR instruction references PMSRBM 800 to determine if the MSR being written is protected. In one embodiment, if the corresponding bit is set, the write is not performed and security logic 101 may generate a security exception. It is noted that in alternative embodiments of PMSRBM 800, a protected MSR may be identified by a clear bit.

In one embodiment, security kernel 121 may respond to the security exception by determining which MSR is being written and examining the data being written. Further, security kernel 121 may complete the access with or without modifying the data, or disallow the write and return to the code sequence or simply abort the code sequence by returning to a normal mode error handling routine, for example.

Figure 9:
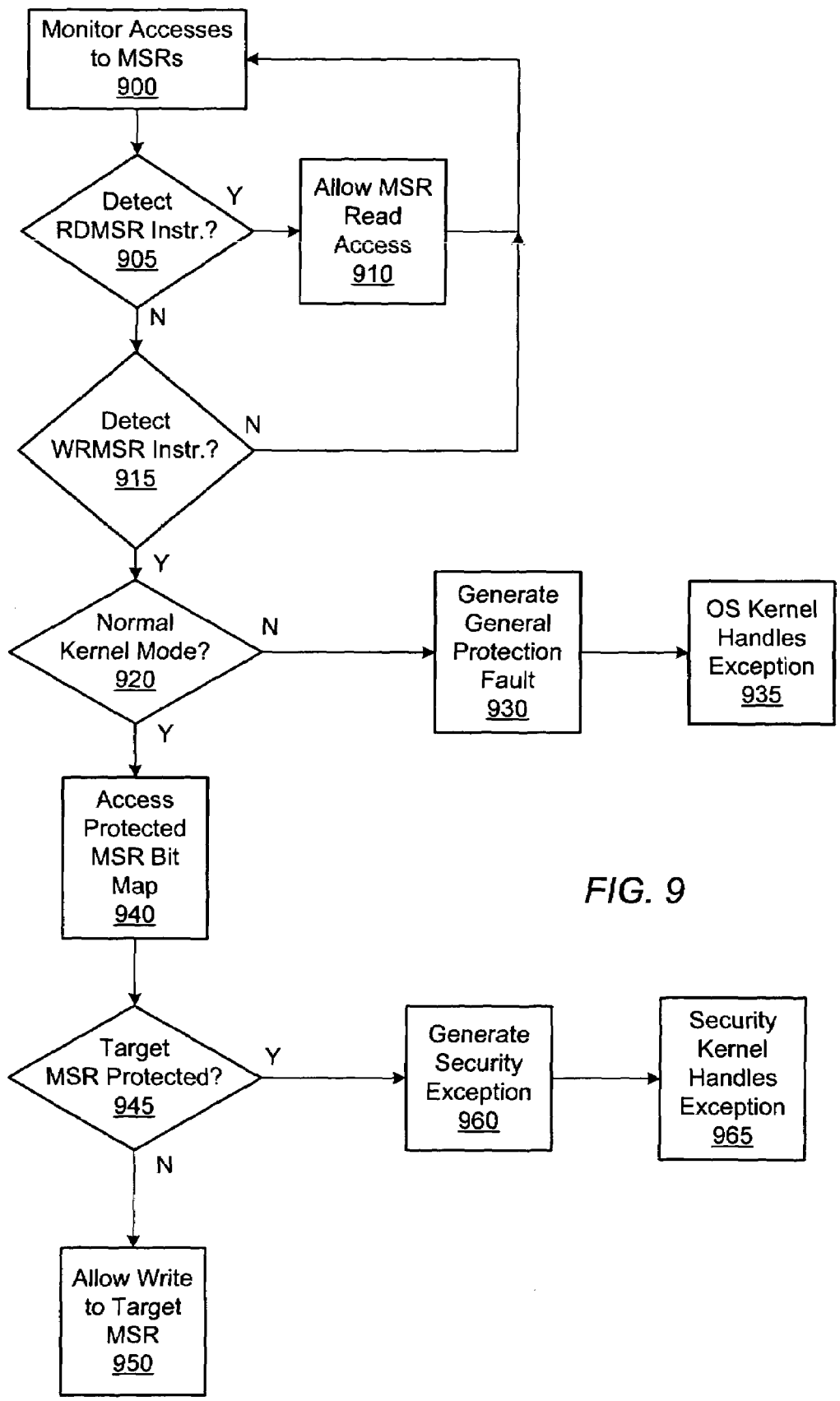
FIG. 9 is a flow diagram describing protection of model specific registers by one embodiment of security logic and the security kernel.

Turning to FIG. 9, a flow diagram describing protection of model specific registers by another embodiment of security logic and the security kernel is shown. Security logic 101 and security kernel 121 may prevent modification to certain protected MSRs. Referring collectively to FIG. 1–FIG. 5 and FIG. 8, in one embodiment, security logic is assumed to be enabled by SEM enable signal 401. Security logic 101 may be configured to monitor all accesses to MSRs (block 900). Security logic 101 is configured to detect RDMSR and WRMSR instructions. Since reads of MSRs are generally allowed, if a RDMSR instruction is detected (block 905), the read is allowed to proceed (block 910).

If a read access is not detected, but a WRMSR access is detected (block 915), and processor 100 is not in normal kernel mode, but is in normal user mode (e.g., CPL=3 and TX=0) (block 920), security logic 101 may cause a general protection fault to be generated (block 930). The general protection fault may be handled by the OS IDT exception handler (block 935).

However if processor 100 is in normal kernel mode (e.g., CPL=0 and TX=0) (block 920), security logic 101 accesses PMSRBM 800 to determine if the target MSR is protected by security kernel 121 (block 940). If the target MSR is not protected (block 945), security logic 101 may allow the write to proceed (block 950).

Referring back to block 945, if security logic 101 determines that the target MSR is protected, security logic 101 may override normal protection logic 410 and may cause a security exception to be generated (block 960). Security kernel 121 handles the security exception (block 965) as described above in conjunction with the description of FIG. 8.

Figure 10:
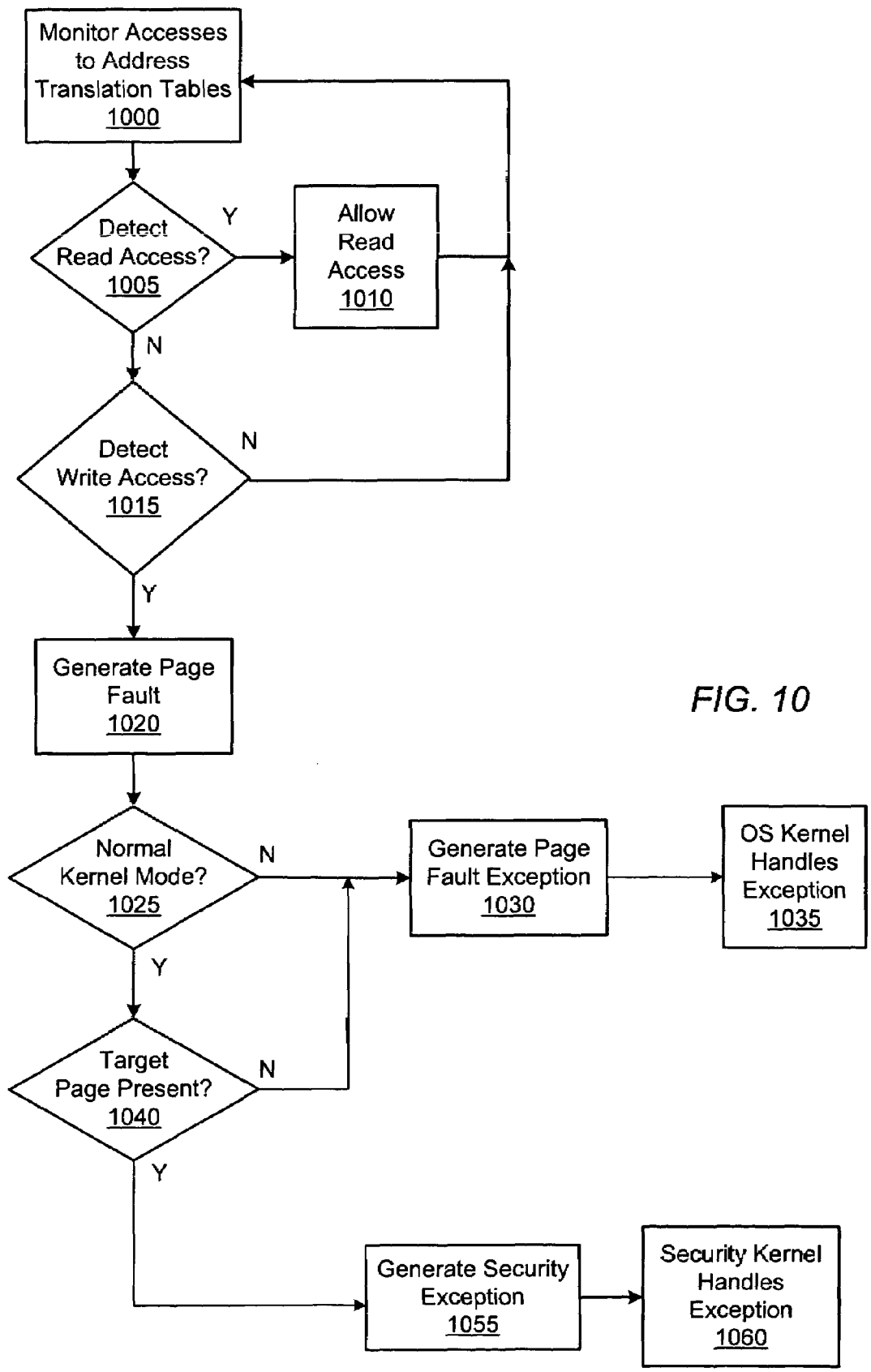
FIG. 10 is a flow diagram describing protection of address translation tables by one embodiment of security logic and the security kernel.

Turning to FIG. 10, a flow diagram describing protection of address translation tables by another embodiment of security logic and the security kernel is shown. Security logic 101 and security kernel 121 may prevent unauthorized modification of address translation tables by using features of existing protection hardware. Referring collectively to FIG. 1–FIG. 5, assume that security logic 101 is enabled by SEM enable 401 and as described in the description of FIG. 5, that the R/W flag has been cleared in each page table during page mapping by security kernel 121 and OS 123. In one embodiment, security logic 101 and normal protection logic 410 of processor 100 may be configured to monitor all accesses to the address translation table hierarchy (block 1000). Protection logic 410 is configured to detect read and write instructions. Since reads of address translation tables are generally allowed, if a read instruction is detected (block 1005), the read is allowed to proceed (block 1010).

If a read access is not detected, but a write access is detected (block 1015), normal protection logic 410 of processor 100 may generate a read-only page fault (block 1020). However, since page faults may occur for legitimate reasons, security logic 101 may filter out some of these reasons. Thus, if processor 100 is operating in normal user mode (e.g., CPL=3 and TX=0) and not normal kernel mode (block 1025), security logic 101 may selectively generate a page fault exception (block 1030) through the normal protection logic 410 to which is handled by the OS IDT exception handler (block 1035).

However if processor 100 is in normal kernel mode (e.g., CPL=0 and TX=0) (block 1025), security logic 101 may perform additional filtering to determine if the page fault is legitimate. For example, in one embodiment, security logic 101 determines if the P flag is set in the proposed page directory/table entry (i.e., indicating that the proposed page directory/table entry is not present) (block 1040). If the page is not present, security logic 101 may selectively generate a page fault exception (block 1030) through the normal protection logic 410 to which is handled by the OS IDT exception handler (block 1035) as above.

However, if the proposed page directory/table entry is present (block 1040), in response to the page fault, security logic 101 may cause a security exception to be generated (block 1050). Security kernel 121 handles the exception (block 1055).

It is noted that in other embodiments, security logic 101 may perform other additional checks (not shown) in response to a page fault. For example, security logic 101 may access the page map vector described above to determine if a proposed address in the write access is a page map. If the page is not a page map, then security logic may generate a page fault exception (block 1030) through the normal protection logic 410 which is handled by the OS IDT exception handler (block 1035) as above. In addition, if a proposed write access would change permission bits or the address within a page directory/table entry, security logic 101 may cause a security exception to be generated (block 1050).

In one embodiment, since write faults may occur in normal kernel mode for legitimate reasons, security kernel 121 may try to determine the cause of the page fault by determining which address is being written and examining the data being written. Further, security kernel 121 may complete the access with or without modifying the data, or disallow the write and return to the code sequence or security kernel 121 may simply abort the code sequence by returning to a normal mode error handling routine, for example.

It is noted that some elements are described as being implemented in hardware while other elements are described as being implemented in software merely as a convenience to convey the operational characteristics of the system and its various components. However, it is contemplated that in various implementations, some or all of the hardware elements described above may be implemented in software and some or all of the software elements described above may be implemented in hardware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of controlling accesses to a model specific register of a processor having a normal execution mode and a secure execution mode, said method comprising:

storing processor information in said model specific register;

protection logic allowing a software invoked write access to modify said information within said model specific register during said normal execution mode;

security logic selectively inhibiting said software invoked write access during said secure execution mode; and creating a bit map including a plurality of bits each corresponding to a different model specific register, wherein each bit is indicative of whether said corresponding model specific register is protected in a normal kernel mode.

2. The method as recited in claim 1 further comprising allowing said software invoked write access to modify said information within said model specific register in response to said processor operating in a secure kernel mode.

3. The method as recited in claim 2, wherein said secure kernel mode includes:

a current privilege level state being equal to zero within a code segment descriptor corresponding to a currently executing code sequence during said secure execution mode; and said processor entering a trusted execution mode.

4. The method as recited in claim 1 further comprising generating a general protection fault exception in response to said software invoked write access and said processor operating in a normal user mode during said secure execution mode.

5. The method as recited in claim 4, wherein said normal user mode includes a current privilege level state being equal to three within a code segment descriptor corresponding to a currently executing code sequence during said secure execution mode.

6. The method as recited in claim 1 further comprising accessing said bit map to determine whether a given model specific register specified in said software invoked write access is protected in said normal kernel mode.

7. The method as recited in claim 6 further comprising storing a base address of said bit map in a base address model specific register.

8. The method as recited in claim 6 further comprising allowing said software invoked write access to proceed in response to determining that said given model specific register specified in said software invoked write access is not protected in said normal kernel mode.

9. The method as recited in claim 8 further comprising inhibiting said software invoked write access from proceeding and generating a security exception in response to determining that said given model specific register specified in said software invoked write access is protected in said normal kernel mode.

10. The method as recited in claim 9, wherein said normal kernel mode includes a current privilege level state being equal to zero within a code segment descriptor corresponding to a currently executing code sequence during said secure execution mode.

11. A processor having a normal execution mode and a secure execution mode, said processor comprising:

execution logic configured to execute code;

a model specific register coupled to said execution logic and configured to store processor information;

protection logic coupled to said model specific register and configured to allow a software invoked write access to modify said information within said model specific register during said normal execution mode;

wherein said protection logic includes security logic configured to selectively inhibit said software invoked write access during said secure execution mode; and wherein said security logic is further configured to access a bit map including a plurality of bits each corresponding to a different model specific register, wherein each bit is indicative of whether said corresponding model specific register is protected in a normal kernel mode.

12. The processor as recited in claim 11, wherein said security logic is further configured to allow said software invoked write access to modify said information in said model specific register in response to said processor operating in a secure kernel mode.

13. The processor as recited in claim 12, wherein said secure kernel mode includes:
   a current privilege level state being equal to zero within a code segment descriptor corresponding to a currently executing code sequence during said secure execution mode; and
   said processor entering a trusted execution mode.

14. The processor as recited in claim 11, wherein said security logic is further configured to generate a general protection fault exception in response to said software invoked write access and said processor operating in a normal user mode during said secure execution mode.

15. The processor as recited in claim 14, wherein said normal user mode includes a current privilege level state being equal to three within a code segment descriptor corresponding to a currently executing code sequence during said secure execution mode.

16. The processor as recited in claim 11, wherein said security logic is further configured to determine whether a given model specific register specified in said software invoked write access is protected in said normal kernel mode.

17. The processor as recited in claim 16, wherein said security logic is further configured to allow said software invoked write access to proceed in response to determining that said given model specific register specified in said software invoked write access is not protected in said normal kernel mode.

18. The processor as recited in claim 17, wherein said security logic is further configured to inhibit said software invoked write access from proceeding and to generate a security exception in response to verifying that said given model specific register is protected in said normal kernel mode.

19. The processor as recited in claim 18, wherein said normal kernel mode includes a current privilege level state being equal to zero within a code segment descriptor corresponding to a currently executing code sequence during said secure execution mode.

20. A computer system comprising:
   a processor having a normal execution mode and a secure execution mode;
   a memory coupled to said processor and configured to store instructions and data;
   wherein said processor includes:
      execution logic configured to execute code;
      a model specific register coupled to said execution logic and configured to store processor information;
      protection logic coupled to said model specific register and configured to allow a software invoked write access to modify said information within said model specific register during said normal execution mode;
      wherein said protection logic includes security logic configured to selectively inhibit said software invoked write access during said secure execution mode; and
      wherein said security logic is further configured to access a bit map including a plurality of bits each corresponding to a different model specific register, wherein each bit is indicative of whether said corresponding model specific register is protected in a normal kernel mode.

21. The computer system as recited in claim 20, wherein said security logic is further configured to allow said software invoked write access to modify said information in said model specific register in response to said processor operating in a secure kernel mode.

22. The computer system as recited in claim 21, wherein said secure kernel mode includes:
   a current privilege level state being equal to zero within a code segment descriptor corresponding to a currently executing code sequence during said secure execution mode; and
   said processor entering a trusted execution mode.

23. The computer system as recited in claim 20, wherein said security logic is further configured to generate a general protection fault exception in response to said software invoked write access and said processor operating in a normal user mode during said secure execution mode.

24. The computer system as recited in claim 23, wherein said normal user mode includes a current privilege level state being equal to three within a code segment descriptor corresponding to a currently executing code sequence during said secure execution mode.

25. The computer system as recited in claim 20, wherein said security logic is further configured to determine whether a given model specific register specified in said software invoked write access is protected in said normal kernel mode.

26. The computer system as recited in claim 25, wherein said security logic is further configured to allow said software invoked write access to proceed in response to determining that said given model specific register specified in said software invoked write access is not protected in said normal kernel mode.

27. The computer system as recited in claim 26, wherein said security logic is further configured to inhibit said software invoked write access from proceeding and to generate a security exception in response to verifying that said given model specific register is protected in said normal kernel mode.

28. The computer system as recited in claim 27, wherein said normal kernel mode includes a current privilege level state being equal to zero within a code segment descriptor corresponding to a currently executing code sequence during said secure execution mode.

* * * * *

UNITED STATES PATENT AND TRADEMARK OFFICE
CERTIFICATE OF CORRECTION

| | | |
|---|---|---|
| PATENT NO. | : 7,043,616 B1 | Page 1 of 1 |
| APPLICATION NO. | : 10/419084 | |
| DATED | : May 9, 2006 | |
| INVENTOR(S) | : Kevin J. McGrath | |

It is certified that error appears in the above-identified patent and that said Letters Patent is hereby corrected as shown below:

<u>In the Specification: Col. 1, line 4</u>

The priority data is missing and the priority claim is missing from the first line in the specification.
    Please amend the patent document to include the priority date of April 18, 2002, and amend the specification by inserting before the first line the sentence --<u>This application claims the benefit of U.S. Provisional Application No. 60/373,571 filed April 18, 2002.</u>--

Signed and Sealed this

Nineteenth Day of December, 2006

JON W. DUDAS
*Director of the United States Patent and Trademark Office*